US010275205B2

(12) United States Patent
Fang et al.

(10) Patent No.: US 10,275,205 B2
(45) Date of Patent: Apr. 30, 2019

(54) SMART EFFECT UNIT

(71) Applicant: Tri-in, Inc., Taipei (TW)

(72) Inventors: Chia-Hung Fang, Taipei (TW);
Li-Wen Chang, New Taipei (TW);
Kuan-Yi Lee, Taichung (TW)

(73) Assignee: TRI-IN, INC., Taipei (TW)

( * ) Notice: Subject to any disclaimer, the term of this patent is extended or adjusted under 35 U.S.C. 154(b) by 198 days.

(21) Appl. No.: 15/292,601

(22) Filed: Oct. 13, 2016

(65) Prior Publication Data
US 2017/0109125 A1 Apr. 20, 2017

Related U.S. Application Data

(60) Provisional application No. 62/242,472, filed on Oct. 16, 2015.

(51) Int. Cl.
*G06F 3/16* (2006.01)
*G10H 1/043* (2006.01)

(52) U.S. Cl.
CPC ............ *G06F 3/162* (2013.01); *G10H 1/043* (2013.01); *G10H 2210/155* (2013.01); *G10H 2220/116* (2013.01)

(58) Field of Classification Search
CPC .... G06F 3/12; G10H 1/043; G10H 2210/155; G10H 2220/116
USPC .......................................................... 84/615
See application file for complete search history.

(56) References Cited

U.S. PATENT DOCUMENTS

| 4,388,490 A | * | 6/1983 | Spector | H04R 3/12 361/730 |
| 4,479,238 A | * | 10/1984 | Spector | H03G 5/04 361/725 |
| 4,481,661 A | * | 11/1984 | Spector | H03G 5/04 361/726 |
| 4,509,190 A | * | 4/1985 | Spector | H04R 3/12 381/119 |
| D282,253 S | * | 1/1986 | Shimizu | D13/164 |
| D282,461 S | * | 2/1986 | Shimizu | D13/162.1 |

(Continued)

FOREIGN PATENT DOCUMENTS

CN 201060636 Y 5/2008
TW 201241821 A 10/2012

*Primary Examiner* — David S Warren
*Assistant Examiner* — Christina M Schreiber
(74) *Attorney, Agent, or Firm* — Muncy, Geissler, Olds & Lowe, P.C.

(57) ABSTRACT

A smart effects unit disclosed includes effects modules, a control module and a switching device. The control module includes a processor, a user interface and a memory. The processor is connected to an musical instrument and effect modules through an input switch interface, such that the audio signal of the instrument is able to be inputted into the effects modules based on a combination configuration to generate a combined effect audio signal. The combination configuration defines the connection sequence of the plurality of effect modules. The user interface is provided to adjust each effect module and the connection sequence order of effect modules through the input interface to generate the combination configuration, which is stored in a memory. The switching device connected to the control module is provided to switch the control module between different combination configurations based on the combination configurations stored in the memory.

10 Claims, 9 Drawing Sheets

(56) References Cited

U.S. PATENT DOCUMENTS

| | | | |
|---|---|---|---|
| 4,936,185 A * | 6/1990 | Yamaguchi | G10H 1/32 200/52 R |
| 5,255,322 A * | 10/1993 | Farinelli | H04R 3/12 361/729 |
| 5,349,129 A * | 9/1994 | Wisniewski | G10H 1/32 446/2 |
| 5,648,753 A * | 7/1997 | Martin | A63H 5/00 340/384.1 |
| 6,052,472 A * | 4/2000 | Lo | H04R 5/02 181/148 |
| 6,353,168 B1 * | 3/2002 | Sosoka, Jr. | G10H 1/0008 446/397 |
| 6,376,761 B1 * | 4/2002 | LaMarra | G10H 1/02 381/118 |
| 7,326,849 B2 * | 2/2008 | Adams | G10H 1/0066 84/743 |
| 7,373,210 B2 * | 5/2008 | Pennock | G10H 1/02 381/118 |
| 7,525,038 B2 * | 4/2009 | Yamada | G10H 1/0091 84/622 |
| 7,711,442 B2 * | 5/2010 | Ryle | G10H 3/186 700/94 |
| 8,420,923 B1 * | 4/2013 | Choi | G10H 1/32 84/476 |
| 8,525,015 B2 * | 9/2013 | Armstrong | G10H 1/348 381/118 |
| 9,263,014 B2 * | 2/2016 | Brandt | G10H 1/0091 |
| 9,520,116 B2 * | 12/2016 | Hummel | H04R 1/028 |
| 9,530,395 B2 * | 12/2016 | Friesen | G10H 1/06 |
| 9,595,248 B1 * | 3/2017 | Classe | G10H 1/348 |
| 9,728,172 B1 * | 8/2017 | Perez | G10H 1/18 |
| 9,972,295 B2 * | 5/2018 | Lee | G10H 1/0091 |
| 2004/0040434 A1 * | 3/2004 | Kondo | G10H 1/0008 84/604 |
| 2004/0147283 A1 * | 7/2004 | Lee | G06F 3/162 455/556.1 |
| 2009/0183625 A1 * | 7/2009 | Sanders | G10H 1/0091 84/626 |
| 2013/0118340 A1 * | 5/2013 | D'Amours | G10H 1/0083 84/746 |
| 2013/0327201 A1 * | 12/2013 | Urry | G10H 1/06 84/626 |
| 2014/0090546 A1 * | 4/2014 | Ceccolini | G10H 1/02 84/626 |
| 2014/0270214 A1 * | 9/2014 | Brandt | G10H 1/0091 381/61 |
| 2016/0019877 A1 * | 1/2016 | Remignanti | G10H 1/0066 84/645 |
| 2016/0258574 A1 * | 9/2016 | Abbate | G10H 1/32 |
| 2016/0275928 A1 * | 9/2016 | Lee | G10H 1/0091 |
| 2016/0293151 A1 * | 10/2016 | Mayo | G10H 1/0058 |
| 2017/0109125 A1 * | 4/2017 | Fang | G06F 3/162 |
| 2017/0124997 A1 * | 5/2017 | Blaschke | G10H 1/0058 |
| 2017/0316766 A1 * | 11/2017 | Perez | G10H 1/18 |
| 2018/0144731 A1 * | 5/2018 | McHale | G10H 1/348 |

* cited by examiner

SMART EFFECT UNIT

CROSS-REFERENCE TO RELATED APPLICATION

This application claims priority to U.S. provisional patent application No. 62/242,472 filed on Oct. 16, 2015 in the United States Patent and Trademark Office, the content of which is hereby incorporated by reference in its entirety for all purposes.

BACKGROUND OF THE INVENTION

1. Field of the Invention

The present invention relates to a smart effect unit, and particularly relates to an effect unit which controls analog audio signals through digital controls.

2. Description of the Related Art

Conventionally, an effect unit can modify sounds of electric instruments or audio signals. Through different connection combinations, multiple effect units can generate various sound effects. Some types of effect units subtly alter the sounds, while others greatly change them. Effect units are used in life shows typically with electric guitar, keyboard, or bass. While most frequently used with electronic music or electronic instruments, effect units can also be used with acoustic instruments, drums and vocals.

Effect units are built into amplifiers, housed in table top units, "stompboxes" and "rackmount units", or they are built into the instruments themselves. An effect unit or "pedal" is small metal or plastic box placed on the floor connected to the musician's instrument. One or more on-off foot-operated switches control an effect unit that provides one or two sound effects. A rackmount device mounts on a standard 19-inch equipment rack and usually contains several types of effects.

However, there are problems of all these effect units, such as being oversized and overweight, which make them difficult to carry, being hard to precisely record, and being unable to change settings, to share, and to communicate with each other.

SUMMARY OF THE INVENTION

To solve the aforementioned problems, the purpose of the present invention is to provide a smart effect unit that improves deficiencies of those conventional effect units.

A smart effect unit according to the purpose of the present invention includes a plurality of effect modules, a control module, and a switching device. Wherein, each effect module comprises an analog circuit and a digital potentiometer that are electrically connected to each other. The digital potentiometer is configured to process the input of the effect audio signals from the analog circuit to generate sound effect. The control module comprises a processor, a user interface, and a memory. The processor is connected to a musical instrument and a plurality of effect modules through an input switch interface, such that the audio signal of the instrument is able to be inputted into the effects modules based on a combination configuration to generate a combined effect audio signal, wherein the combination configuration defines a connection sequence order of the plurality of effect modules. The user interface is provided for the user to adjust each of the plurality of effect modules and to adjust the connection sequence order of the plurality of effect modules through the input interface to generate at least one combination configuration. The user switches between combination configurations according to at least one combination configurations stored in the memory through the switching device connected to the control module.

Preferably, the smart effect unit further comprises a housing, wherein the control module is positioned inside the housing.

Preferably, the housing has a plurality of slots.

Preferably, the input switch interface electrically connects the plurality of slots, and the plurality of effect modules are plugged into the plurality of slots respectively.

Preferably, the input switch interface electrically connects the processor.

Preferably, the plurality of effect modules each comprises a microprocessor or an effect unit memory, and the electric potential of each digital potentiometer is adjusted via the control of the microprocessor by controlling the processor through the user interface or the electric potential of each digital potentiometer is adjusted based on the data of the digital potentiometer stored in the effect unit memory.

Preferably, the smart effect unit further includes a display device, which is configured to display the audio effect and the combination configuration of the plurality of effect modules through the controlling of the processor.

Preferably, the control module further includes a wireless communication device, which is connected to the processor and is configured to communicate with an electronic media.

Preferably, the electronic media comprises a display module, which is used to display audio effects and combination configurations of the plurality of effect modules.

Preferably, the electronic media comprises a user management interface for the user to remotely adjust audio effects and combination configurations.

As aforementioned, the smart effect unit of the present invention can have one or more advantages as follows:

1. The smart effect unit of the present invention can effectively minimize its size. Through the modularization and integration of the effect unit, the volume can be reduced significantly.

2. The smart effect unit of the present invention can completely setup and record every effect through integration control and can be remotely regulated through wireless means.

DESCRIPTION OF THE PREFERRED EMBODIMENTS

In order for the examiners to comprehend the technical features, contents, advantages, and its effects, with reference to the accompanying drawings, the present invention will be described in detail with embodiments. Since being only for the illustrative purpose, the drawings are not necessarily implying the actual size, ratio, or precise configuration. Therefore, the claims of the present invention should not be limited by the drawings' size, ratio and configuration.

The embodiments of the smart effect unit will be described hereinafter accompanying with corresponding figures. For better understanding, the same elements will be designated by the same reference numerals in the following embodiments.

Figure 1:
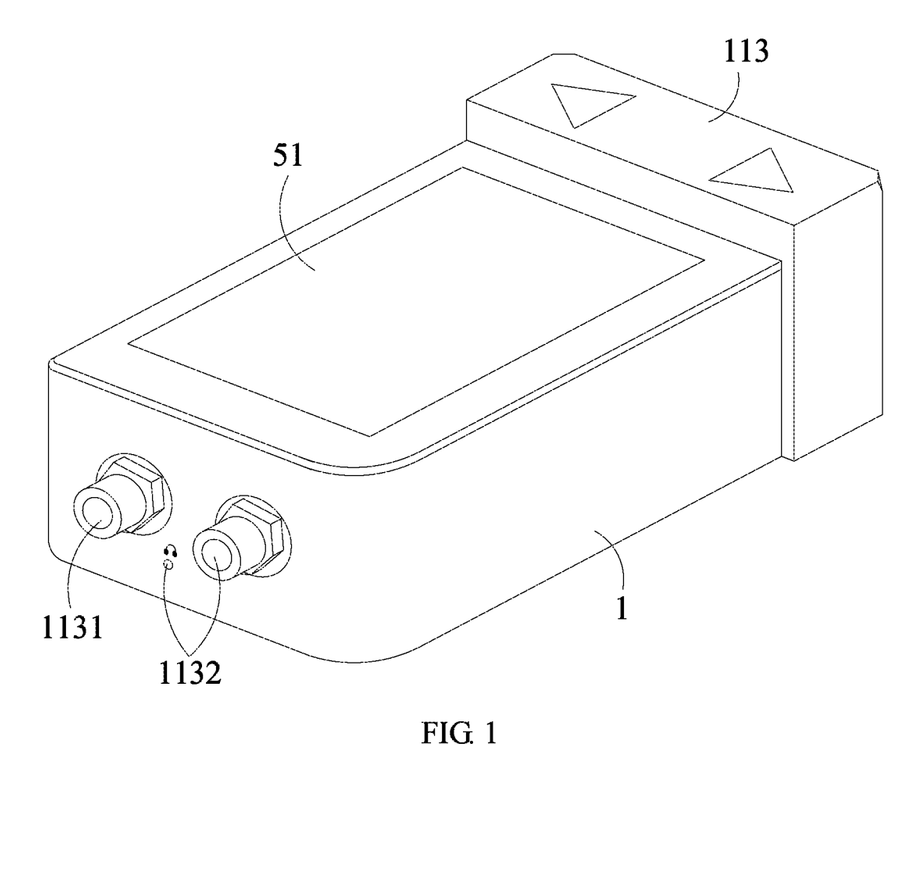
FIG. 1 is a top perspective view of the smart effect unit according to the embodiment of the present invention.
Figure 2:
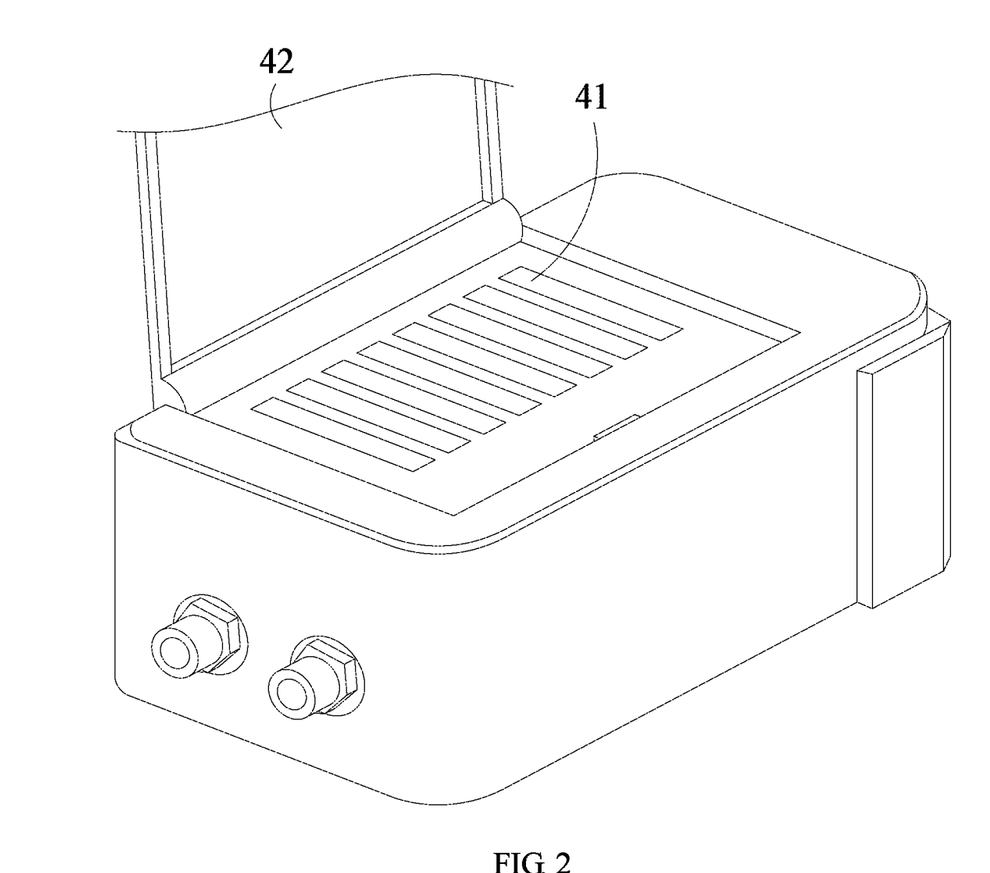
FIG. 2 is a bottom perspective view of the smart effect unit according to the embodiment of the present invention.

The embodiments of appearance and internal structure of the smart effect unit of the present invention will be described hereinafter. Referring to FIGS. 1 and 2, they are respectively top and bottom perspective views of the smart effect unit according to the embodiment of the present invention.

As shown in the figures, the smart effect unit of the present invention includes a housing 1, a plurality of slots 41, a bottom cover 42, a display device 51, a user interface 113, an input 1131, and an output 1132. The typical operation flow of the smart effect unit is as follows: connecting the electronic instrument to the smart effect unit via the input 1131, and controlling the smart effect unit through the user interface 113 shown on the display device 51. Specifically, the display device 51 shows parameters of the smart effect unit, such as the state of use of the effect unit, the mode of the effect unit, the function bar, and the power of the effect unit. While the plurality of effect modules are plugged into the slots 41 located at the bottom of the smart effect unit, the bottom cover 42 can help fix the effect modules to the slots and prevent them from falling out of the smart effect unit during operation. The difference from the conventional multiple effect units connected in sequence is that the configuration of the plurality of slots 41 of the smart effect unit of the present invention is expandable. Through plugging in modularized effect modules, the amount of the connection sequence can be significantly increased without increasing the unit's size. Moreover, the user interface 113 provides the user to customize the connection modes and sequences of the effect modules. These will be further described hereinafter.

Referring to FIG. 3 to FIG. 5A, they are respectively the side view and the top view of the smart effect unit according to another aspect of the embodiment of the present invention and the schematic diagram showing the effect module of the smart effect unit according to the embodiment of the present invention. Similar to FIGS. 1 and 2, except those devices already mentioned, there are a left pedal 31 and a right pedal 32 of a switching device 30 further included in FIGS. 3 and 4.

Figure 3:
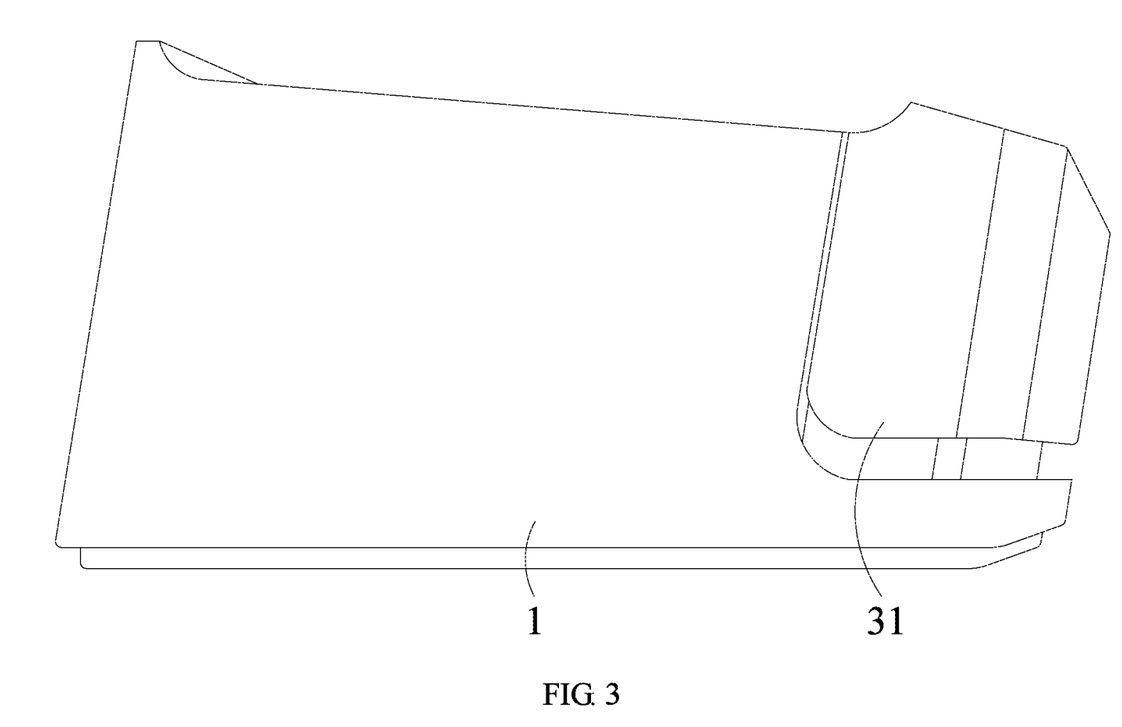
FIG. 3 is a side view of the smart effect unit according to another aspect of the embodiment of the present invention.
Figure 4:
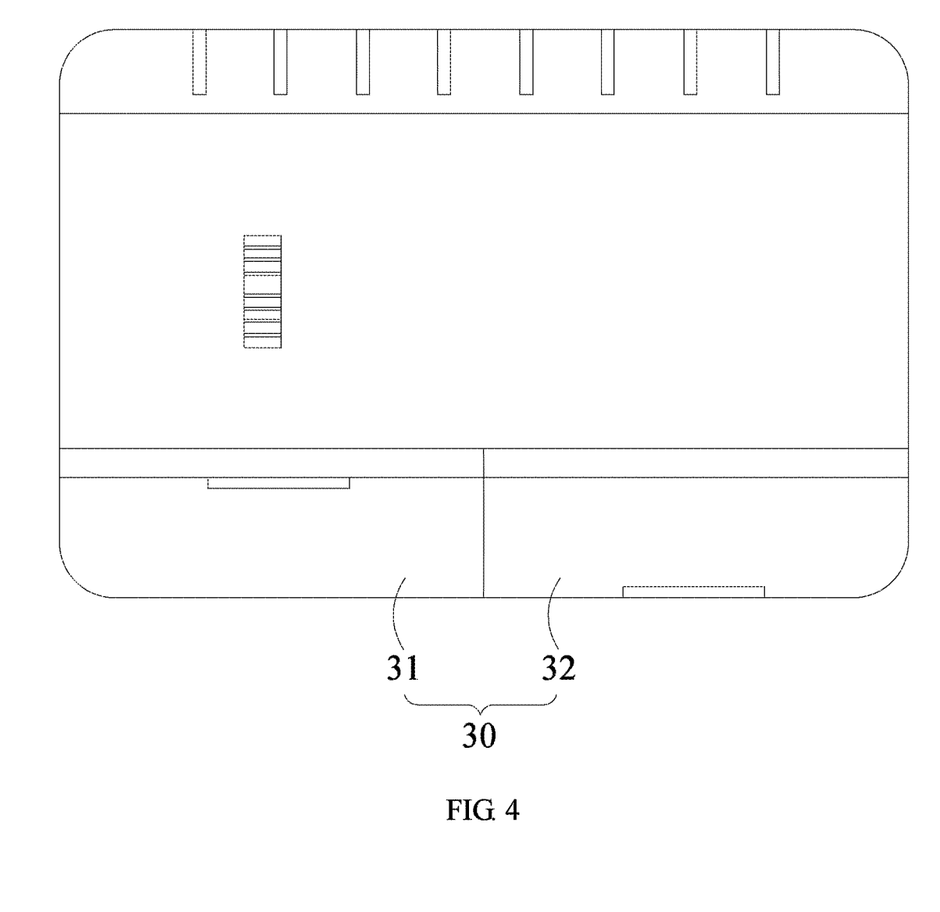
FIG. 4 is a top view of the smart effect unit according to another aspect of the embodiment of the present invention.
Figure 5A:
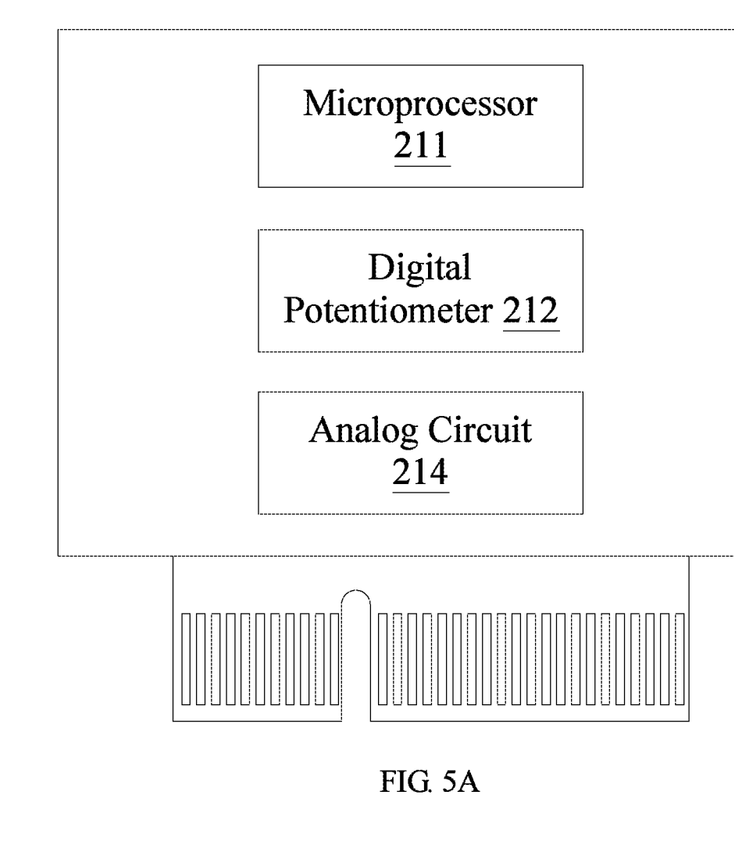
FIG. 5A is a schematic diagram showing an effect module of the smart effect unit according to the embodiment of the present invention.

The modularized effect modules 21 are plugged into the slots 41. Practically, the function of the effect module 21 is the same as those analog effect units commonly found in the markets. The effect module 21 of the present invention is made by modularizing an analog effect unit to a miniature form like an effect card. While plugging into the slots 41 with an appropriate arrangement, the effect modules 21 can be connected sequentially with each other. Moreover, the combination configurations of the connection sequences can be acquired and recorded by pre-adjusting audio effects of each effect module 21 through the user interface 113 and can be switched from one to another by the left pedal 31 and the right pedal 32. Specifically, the amount of pedals is not limited to those shown in the figures. Furthermore, the slots 41 and the effect modules 21 are designed such that the connection positions between the slots 41 and the effect modules 21 are not affected during pedaling. The interface of the slots 41 can be, but not limited to, PCIE interface or battery contact type interface.

Also noticed that the effect modules 21 can control the digital potentiometer 212, e.g. potentiometer IC. Then the digital potentiometer 212 control the analog circuit 214 and then processes the effect audio signals which inputted to the analog circuit 214 to generate audio effects. The appearance of the smart effect unit of the present invention has be briefly described above. The detail structure and operational modes will be described hereinafter.

Figure 6:
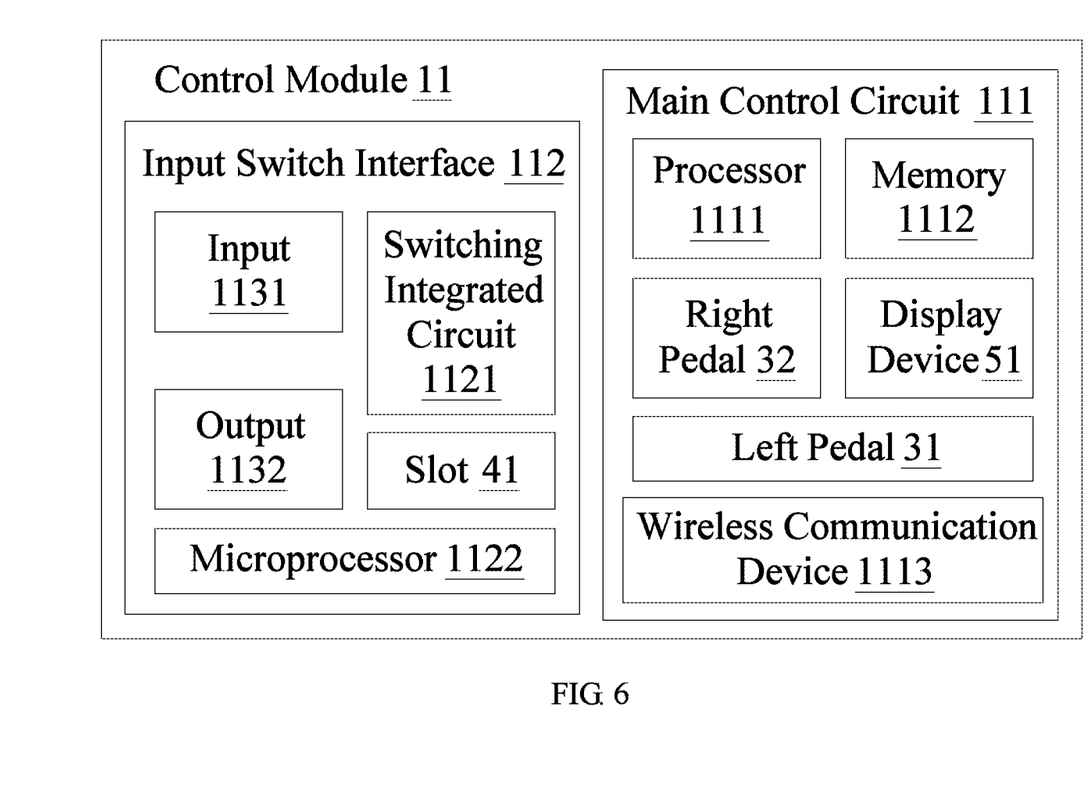
FIG. 6 is a schematic diagram showing a control module of the smart effect unit according to the embodiment of the present invention.
Figure 7:
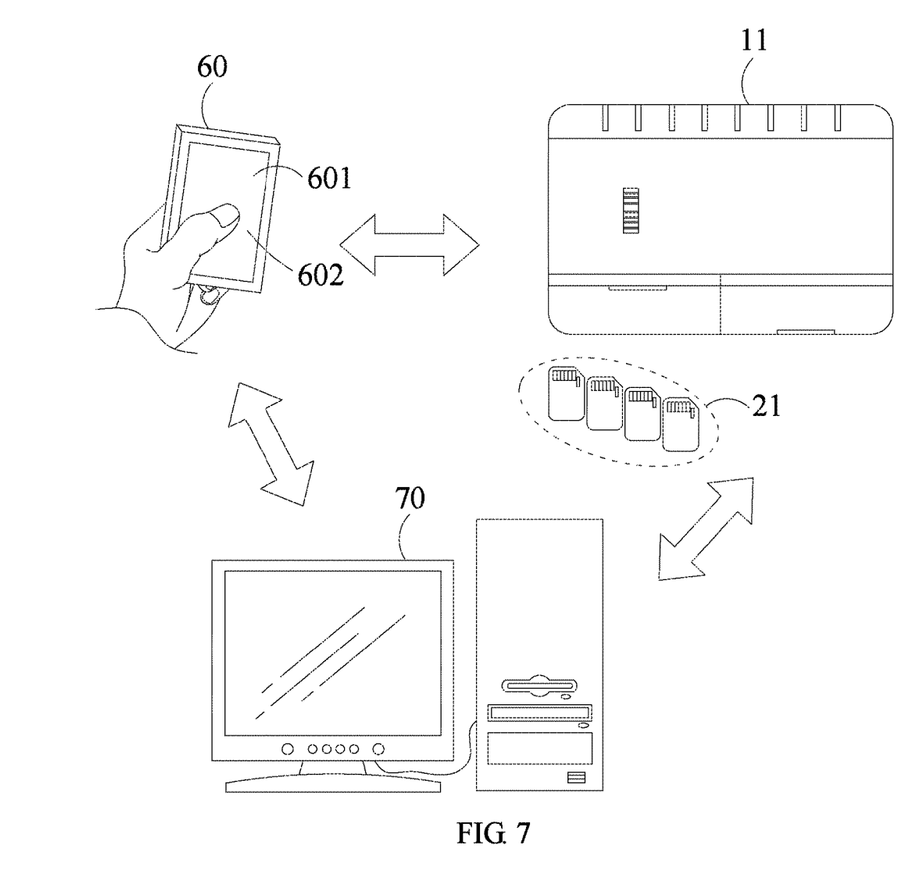
FIG. 7 is a schematic diagram showing the usage of the smart effect unit according to the embodiment of the present invention.

Referring to FIGS. 6 and 7 and Figures discussed above. FIGS. 6 and 7 are schematic diagram showing the control module and the usage according to the embodiment of the present invention. As shown in the figures, the control module 11 includes a main control circuit 111, an input switch interface 112, a memory 1112, and a switching device 30. The main control circuit 111 in the control module 11 is the information processing center of the smart effect unit of the present invention. Through the connection of a music instrument to the input 1131 of the input switch interface 112 and the electrical connection of the effect modules 21 to the input switch interface 112 via the slots 41, the audio signals of the music instrument are inputted to the effect modules 21 to generate combined effect audio signals based on the combination configurations, which are defined by the connection sequence orders of the effect module 21. After adjusting the effect module 21, the audio effect settings, the combination configurations, and the rest of information are stored in the memory 1112 of the main control circuit 111. As for amplifiers or other studio equipment, they are connected to the output 1132 of the input switch interface 112.

More specifically, as shown in the figures, the left pedal 31 and the right pedal 32 of the switching device 30 are connected to the main control circuit 111 of the control module 11. A user can therefore switch the control module 11 between different combination configurations via the left pedal 31 and the right pedal 32 based on the combination configurations stored in the memory 1112. In addition, the display device 51 is also electrically connected to the main control circuit 111 and controlled by the microprocessor 1122 of the main control circuit 111. In addition to the disposition of the user interface 113 on the side of the display device 51, the user interface 113 can also be integrated with the display device 51, such that a user can respectively adjust audio effects of the effect modules 21 through a touch screen or any other ways that fulfill the purpose. Also, through the input switch interface 112, the connection sequence order of the effect modules 21 can be adjusted to generate at least one combination configuration. The input switch interface 112 mentioned can preferably include a switching integrated circuit 1121 that includes switches selected from switching circuits or logic gates; therefore, various connection sequences and orders can be provided to generate a plurality of combination configurations of the effect units 21.

While switching the combination configurations of the effect modules 21 through the switching device 30, the switching integrated circuit 1121 and the microprocessor 1122 of the input switch interface 112 are controlled by the processor 1111 of the main control circuit 111 through the user interface 113 to control the switching integrated circuit 1121 in the input switch interface 112 and to control the effect modules 21 which are plugged into the slots 41 that electrically connected to the input switch interface 112, can be controlled to obtain different combinations of effect modules 21. The effect modules 21 can include various types of audio effects, such as distortion, dynamics (affecting loudness), filter, modulation, pitch, frequency, etc. Various types of effect modules 21 can then be combined to generate various audio effects. For example, the effect unit can adjust amplitudes to modify signals of electronic instruments, such as the effects of distortion, compressor, noise gate, wah-wah, and phaser, or can delay the signals of electronic instruments to produce the effects of chorus, flanger, reverb, delay, etc. The settings of each effect module 21 is controlled through the controlling of digital potentiometer 212 in the effect module 21 by the microprocessor 211 in the effect module 21. The modularization of the effect unit can then be achieved by the control method of digitally modulating analog signals; therefore, the innovated control and usage mode can be achieved.

Wherein, the number of processors 1111 depends on the number of effect modules 21 adopted.

Figure 5B:
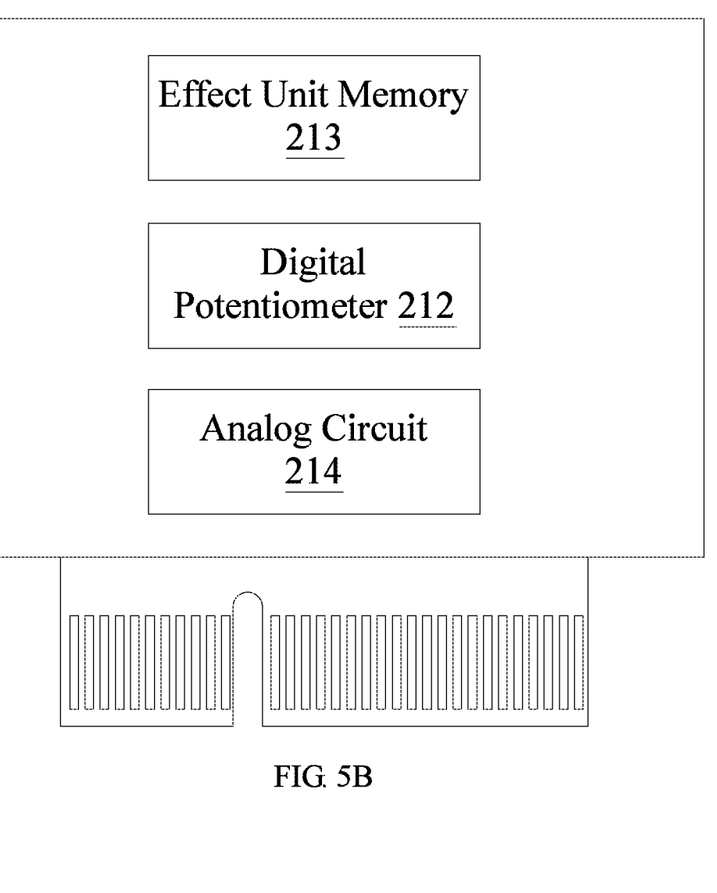
FIG. 5B is a schematic diagram showing an effect module of the smart effect unit according to another aspect of the embodiment of the present invention.

Referring again to FIG. 5A in addition with FIG. 5B, FIG. 5B is a schematic diagram showing an effect module of the smart effect unit according to another aspect of the embodiment of the present invention. In the figures, the effect modules 21 can each include a microprocessor 211 or an effect unit memory 213. The effect module 21 is configured to control the processor 1111 via the user interface 113. The electric potential of each digital potentiometer 212 is then adjusted through controlling the microprocessor 211 or based on the data of the digital potentiometer 212 stored in the effect unit memory 213. These are the two different examples that fulfill the actual needs, but the invention is not limited to these.

Furthermore, the digital potentiometer 212 is used for controlling the resistance on the effect module 21 to regulate the analog circuit 214 and then generate audio signals. The number of the digital potentiometers depend on actual needs. Since there are both digital controls and analog signals and the high frequency signals of the digital controls easily affect the analog circuit 214, the good isolation between digital and analog is then provided in the present invention. The housing of the effect module 21 can also block electromagnetic wave to some extent. In addition, the relative shift of the contact points of the analog audio signal circuit can cause large amount of noise. Therefore, the firm connection between the effect module 21 and the housing 1 is required.

In addition, since the main control box contains the main control circuit 111, the input switch interface 112, the left pedal 31, the right pedal 32, and the display device 51, under all required conditions unaffected, the design of the main control box is based on the principle of compact in size with low center of gravity, such that the box would not be tumbled during pedaling.

The left pedal 31 and the right pedal 32 are connected to the main control circuit 111 through jumpers to prevent the impacts on other circuit boards during the act of pedaling. Besides, the left pedal 31 and the right pedal 32 of the present invention are designed to allow them to be pressed at any location on their surfaces. The planes of the pedals would not be skewed, and except the clicking sensation, the resistance force is constant during the pressing. The noise of the clicking is also minimized. The left pedal 31 and the right pedals 32 of the present invention should also have long-term durability for being continuously pressed, e.g. being pressed once per minute and 5 hours a day, and the workability can last for 10 years.

Additionally, the main control circuit 111 further includes a wireless communication device 1113. The wireless communication device 1113 is configured to communicate with the electronic media 60, wherein the electronic media 60 includes a display module 601 and a user management interface 602, which are used to show the audio effects and the combination configurations of the effect modules 21. In this case, the electronic media 60 can be a handheld multi-media device, such as cell phone, tablet, etc., which is used to remotely control the smart effect unit of the present invention. The wireless communication device 1113 can communicate with the electronic media 60 through WIFI or Bluetooth. The audio effects and the combination configurations of the effect modules 21 can be preset by the electronic media 60 and stored as the default settings. In this way, the settings can be directly used during a performance. Except to communicate with the electronic media through wireless signals, the effect of the analog audio circuit of the present invention being digitally controlled can be achieved by wired means through software adjustment.

As shown in FIG. 7, except using the electronic media 60 of the handheld multimedia device to remotely control the smart effect unit of the present invention, the smart effect unit of the present invention can also be directly controlled by a computer 70 through wireless network. Therefore, the users can have various kinds of operational interfaces.

For example, a user can adjust the parameters of the effect modules 21 via the APP installed in the cell phone and store the adjusted results in the memory 1112. These results can then be used though the left pedal 31 and the right pedal 32. For example, the pressing of the left pedal 31 switches to use the last combination configuration, the pressing of the right pedal 32 switches to use the next combination configuration, the pressing of both the left pedal 31 and the right pedal 31 is for one to access the setting mode of the effect modules 21, etc.

The smart effect unit of the present invention has various kinds of operational modes. For example, while being disconnected with the electronic media 60, a user can switch through different stored settings by the left pedal 31 and the right pedal 32 and can apply the chosen one to the effect module 21.

While being connected with the electronic media 60, such as a cell phone, a user can use the electronic media 60 to connect to the smart effect unit of the present invention and adjust the audio effects of the effect modules 21 and store the adjusted settings in the memory 1112. In addition, while operated by the electronic media 60, the display device 51 of the smart effect unit can synchronously show the operation result of the electronic media 60.

While the smart effect unit and the electronic media 60 are in connection, a user can also switch through stored settings by using the left pedal 31 and the right pedal 32 and apply the chosen setting to the effect modules 21. The chosen setting can also be shown on the display module 601 of the electronic media 60 synchronously.

Figure 8:
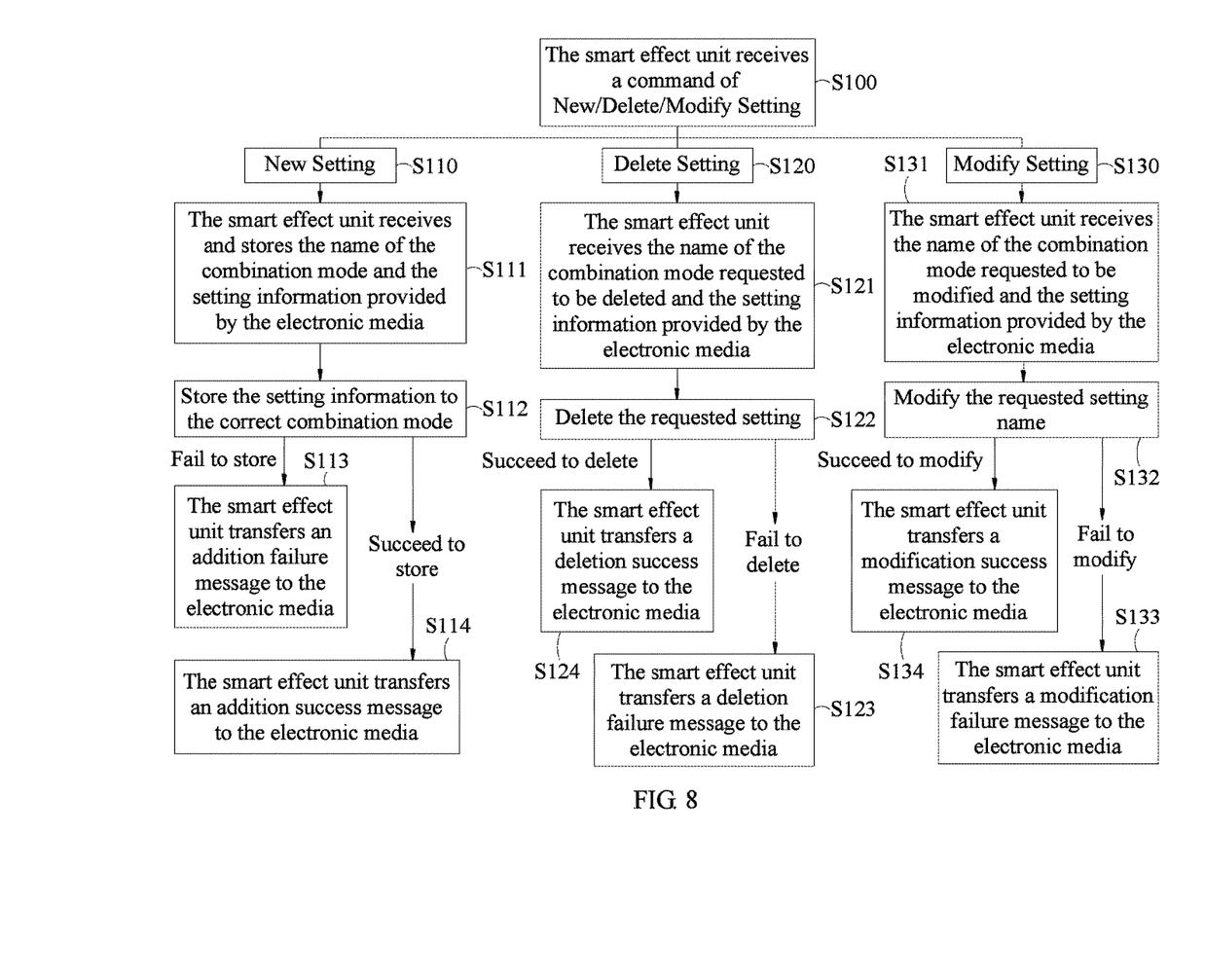
FIG. 8 is the flow chart of the operation according to the embodiment of the present invention.

Referring to FIG. 8, it shows the flow chart of the operation according to the embodiment of the smart effect unit of the present invention.

As shown in the figure, in S100, while receiving the command of "New Setting", "Delete Setting", or "Modify Setting", the smart effect unit will process to the next step S110, S120, or S130 accordingly. The operation flow of S110 to S114 is for the command of "New Setting". As shown in the figure, the APP of the electronic media 60 provides a success or a failure message of storing a new setting in the case while the electronic media 60 is in communication. The operation flow of S120 to S124 is for the command of "Delete Setting". As shown in the figure, the APP of the electronic media 60 provides a success or a failure message of deleting a setting in the case while the electronic media 60 is in communication. The operation flow of S130 to S134 is for the command of "Modify Setting". As shown in the figure, the APP of the electronic media 60 provides a success or a failure message of modifying a setting in the case while the electronic media 60 is in communication.

Except using the APP of the electronic media 60 to setup the smart effect unit, one can also upload the setting data to clouds or store it in an external device. Therefore, the data can be directly load or download to the electronic media 60 or a computer 70 for editing or direct use. This mechanism will be able to achieve the effect of sharing resources.

In summary, accompanying with the processor, the switching circuit, the effect modules arranged appropriately, the smart effect module of the present invention can completely setup and record audio effects of each effect module through integration control.

The aforementioned contents are intended to be illustrative but not restrictive. It is also intended that the following appended claims be interpreted as including all alterations, permutations, and equivalents as fall within the true spirit and scope of the present invention.

What is claimed is:

1. A smart effect unit, comprising:
   a plurality of effect modules, each including an analog circuit and at least one digital potentiometer electrically connected, the digital potentiometer being configured to process an effect audio signal inputted to the analog circuit by controlling a resistance on the plurality of effect modules and to generate an audio effect;
   a control module, including:
   a processor, connected to a musical instrument and the plurality of effect modules via an input switch interface, and the processor being configured such that the audio signal of the musical instrument is inputted into the plurality of effects modules based on a configuration to generate a combined effect audio signal, the combination configuration defining a connection sequence order of the plurality of effect modules;
   a user interface, configured for a user to adjust the audio effect of each of the plurality of effect modules and to adjust the connection sequence order of the plurality of effect modules through the input switch interface to generate at least one combination configuration; and
   a memory, configured to store at least one combination configuration;
   a switching device, connected to the control module for allowing the user to switch among different combination configurations stored in the memory; and
   an effect modules housing, blocking electromagnetic wave to prevent the analog circuit from being affected by high frequency digital signals.

2. The smart effect unit of claim 1, further comprising a housing accommodating the control module.

3. The smart effect unit of claim 2, wherein the housing includes a plurality of slots.

4. The smart effect unit of claim 3, wherein the input switch interface is electrically connected to the plurality of slots and the plurality of effect modules are plugged into the plurality of slots respectively.

5. The smart effect unit of claim 1, wherein the input switch interface is electrically connected to the processor.

6. The smart effect unit of claim 1, wherein the plurality of effect modules each comprises a microprocessor or an effect unit memory, and electric potential of each of the digital potentiometer is adjusted via the control of the microprocessor by controlling the processor through the user interface or the electric potential of each of the digital potentiometer is adjusted based on data of the digital potentiometer stored in the effect unit memory.

7. The smart effect unit of claim 1, further comprising a display device, electrically connected to the control module and configured to display the audio effect and the combination configuration of the plurality of effect modules through the controlling of the processor.

8. The smart effect unit of claim 1, wherein the control module further includes at least one wireless communication device connected to the processor and configured to communicate with at least one electronic media.

9. The smart effect unit of claim 8, wherein the electronic media includes a display module to display the audio effect and the combination configuration of the plurality of effect modules.

10. The smart effect unit of claim 8, wherein the electronic media includes a user management interface providing the user to remotely adjust the audio effect and the combination configuration.

* * * * *